US010714763B2

(12) United States Patent
Kinpara et al.

(10) Patent No.: US 10,714,763 B2
(45) Date of Patent: Jul. 14, 2020

(54) METHOD FOR PRODUCING SEPARATOR BY MOLD WITH GROOVES FOR REDUCING FRICTION

(71) Applicant: TOYOTA JIDOSHA KABUSHIKI KAISHA, Toyota-shi, Aichi-ken (JP)

(72) Inventors: Hiroshi Kinpara, Toyota (JP); Taichi Yamaguchi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 120 days.

(21) Appl. No.: 16/014,250

(22) Filed: Jun. 21, 2018

(65) Prior Publication Data

US 2018/0375113 A1  Dec. 27, 2018

(30) Foreign Application Priority Data

Jun. 23, 2017  (JP) .................................. 2017-123589

(51) Int. Cl.
| H01M 8/0232 | (2016.01) |
| H01M 8/026 | (2016.01) |
| H01M 8/1069 | (2016.01) |
| H01M 8/1018 | (2016.01) |
| H01M 8/0206 | (2016.01) |

(52) U.S. Cl.
CPC ......... *H01M 8/0232* (2013.01); *H01M 8/026* (2013.01); *H01M 8/1069* (2013.01); *H01M 8/0206* (2013.01); *H01M 2008/1095* (2013.01)

(58) Field of Classification Search
CPC .. H01M 8/0232; H01M 8/026; H01M 8/0206; H01M 8/1069

USPC .................................................. 429/514, 535
See application file for complete search history.

(56) References Cited

U.S. PATENT DOCUMENTS

| 2003/0068523 | A1* | 4/2003 | Kaneta .................. B32B 15/018 428/670 |
| 2007/0148526 | A1* | 6/2007 | Farrington .......... H01M 8/0247 429/414 |
| 2007/0245799 | A1 | 10/2007 | Asakawa |
| 2009/0214926 | A1* | 8/2009 | Watanabe ........... H01M 8/0206 429/514 |
| 2011/0123904 | A1 | 5/2011 | Fujimura et al. |

(Continued)

FOREIGN PATENT DOCUMENTS

| JP | 05-065498 U | 8/1993 |
| JP | 2001-143722 A | 5/2001 |
| JP | 2003-272653 A | 9/2003 |

(Continued)

*Primary Examiner* — Sean P Cullen
(74) *Attorney, Agent, or Firm* — Finnegan, Henderson, Farabow, Garrett & Dunner, LLP (57) ABSTRACT

A method for producing a fuel cell separator capable of ensuring the working accuracy for a separator material. A surface of a mold is provided with grooves, each groove having a depth and width each equivalent to or larger than the thickness of a coating layer and equivalent to or smaller than the thickness of the separator material, the mold including an upper die having a projection/recess pressing surface on which projecting and recessed surfaces extending in a predetermined direction are alternately provided, and a lower die having a projection/recess pressing surface in a shape complementary to that of the pressing surface of the upper die.

3 Claims, 6 Drawing Sheets

(56) References Cited

U.S. PATENT DOCUMENTS

2014/0087287 A1* 3/2014 Suzuki ................ H01M 8/0228
  429/479
2016/0268611 A1   9/2016 Suzuki et al.

FOREIGN PATENT DOCUMENTS

| JP | 2005-199421   | 7/2005  |
| JP | 2008-282728 A | 11/2008 |
| JP | 2015-95314    | 5/2015  |

* cited by examiner

METHOD FOR PRODUCING SEPARATOR BY MOLD WITH GROOVES FOR REDUCING FRICTION

CROSS REFERENCE TO RELATED APPLICATIONS

The present application claims priority from Japanese patent application JP 2017-123589 filed on Jun. 23, 2017, the content of which is hereby incorporated by reference into this application.

BACKGROUND

Technical Field

The present disclosure relates to a method for producing a fuel cell separator that has a substrate with a coating layer formed on the surface thereof.

As a surface treatment technique used in producing a fuel cell separator, a technique of coating a surface with a carbon-based conductive coating (carbon coating) has been developed in place of a conventional noble metal plating technique using Au and the like (see, for example, JP 2015-095314 A).

Figure 6:
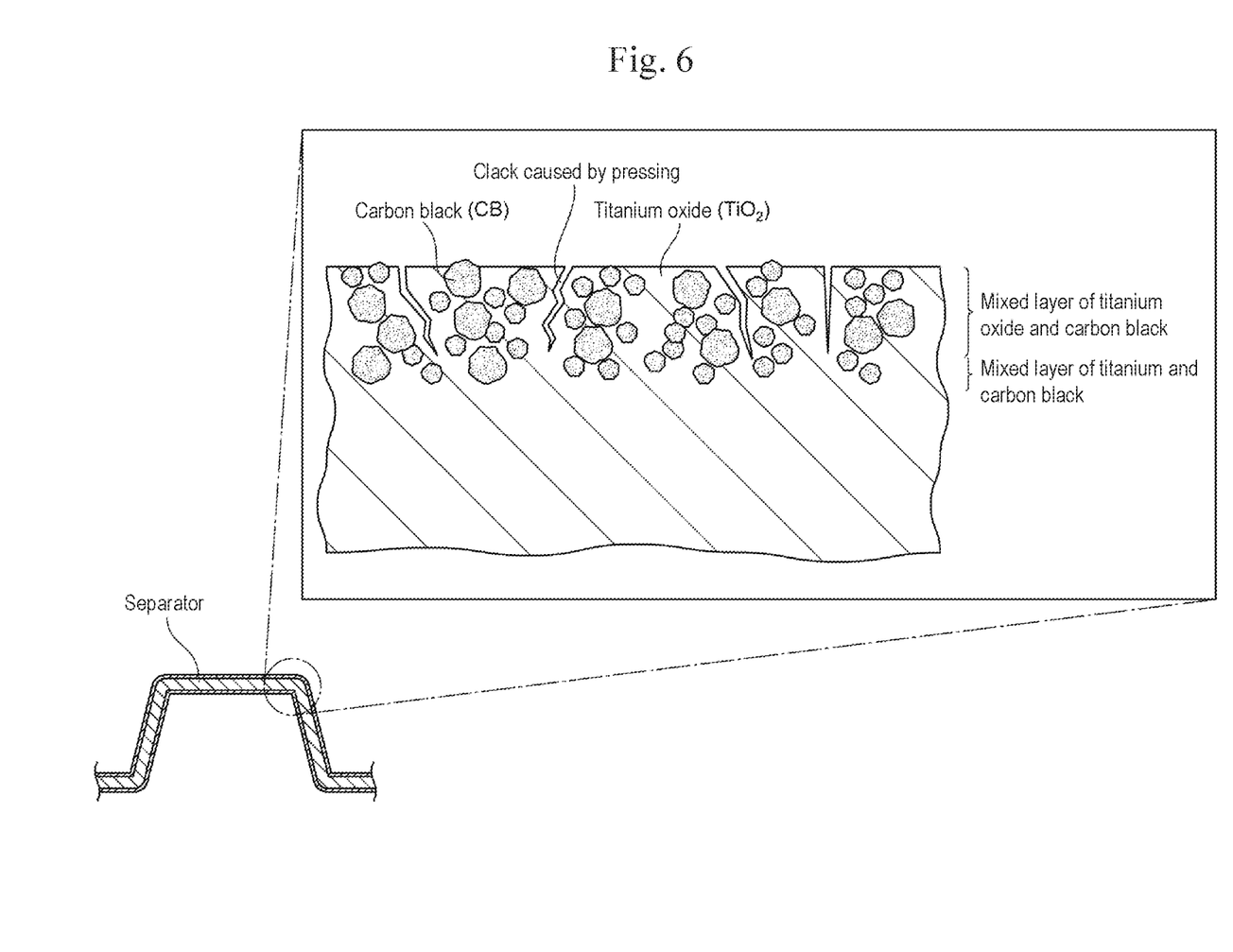
FIG. 6 is a schematic enlarged cross-sectional view of the main part of the separator that has a titanium substrate with a carbon layer formed on the surface thereof.

Conventionally, as substrates of separators, those made of metal materials such as SUS and titanium have been used. In particular, a titanium substrate has been used considering its high corrosion resistance. When the titanium substrate is used as the substrate, an oxide coating including a titanium oxide ($TiO_2$) layer is naturally formed on the outermost surface layer (up to a depth of around 0.2 μm from the surface) of the titanium substrate in the atmosphere. It has been confirmed that when a carbon-based conductive coating is formed on the titanium substrate with such a titanium oxide layer, using a hydrocarbon-based gas material through performing plasma CVD (chemical vapor deposition using plasma), for example, a mixed layer of a titanium oxide (titanium oxide layer) and carbon black (carbon layer) is formed on the outermost surface layer of the titanium substrate. It has also been confirmed that depending on the conditions of the plasma CVD, a mixed layer of titanium and carbon black is further formed below the aforementioned mixed layer (see FIG. 6).

Further, in order to solve a problem in adhesiveness between the aforementioned titanium oxide layer and carbon layer, a technique has already been used that includes forming an intermediate layer including one or more elements selected from metals of Ti, Zr, Hf, V, Nb, Ta, Cr, Mo, and W, or from metalloid elements of Si and B on the titanium oxide layer (oxide coating on the substrate) so as to provide a carbon layer thereon or that includes removing the titanium oxide layer from the surface of the titanium substrate through etching or the like so as to form a carbon layer on the substrate.

Such a substrate having formed on its surface the carbon layer containing carbon particles is press-molded (plastically deformed) into a wavelike shape or projection/recess shape as viewed in cross section using a mold (see, for example, JP 2005-199421 A), so that a groove (gas channel) that functions as a channel for gas (hydrogen, oxygen, and the like) is formed on the substrate.

A fuel cell stack is formed such that a plurality of fuel cells, each cell having anode and cathode and an electrolyte membrane sandwiched therebetween, are layered (stacked) with separators interposed therebetween, each separator having the gas channel formed thereon.

Examples of fuel cells that have been developed include a polymer electrolyte fuel cell (PEFC), alkaline fuel cell (AFC), phosphoric acid fuel cell (PAFC), molten carbonate fuel cell (MCFC), solid oxide fuel cell (SOFC), and biological fuel cell. The polymer electrolyte fuel cell, for example, includes a membrane electrode assembly (MEA) having an ion-permeable electrolyte membrane and an anode catalyst layer (electrode layer) and a cathode catalyst layer (electrode layer) that sandwich the electrolyte membrane therebetween. A gas diffusion layer (GDL) for collecting electricity generated through an electrochemical reaction as well as providing a fuel gas or an oxidant gas is formed on each of the opposite sides of the MEA. The MEA with the GDLs disposed on the opposite sides thereof is referred to as a membrane electrode and gas diffusion layer assembly (MEGA), which is sandwiched by a pair of separators, each separator having the aforementioned gas channel formed thereon. Herein, the MEGA functions as an electricity-generating portion of the fuel cell, and if the gas diffusion layers are not provided, the MEA functions as the electricity-generating portion of the fuel cell.

Background Art

When a carbon layer is present on the surface of a substrate of a separator, upon application, to the substrate (for example, a titanium substrate), of force sufficient to plastically deform it using a mold for forming the aforementioned gas channels on the anode and cathode sides, a portion of the carbon layer (the carbon layer including a titanium oxide when the substrate is a titanium substrate) on the surface of the substrate peels off during pressing (see FIG. 6), and particles that have peeled off are accumulated on the surface of the mold. This poses a problem in that the coefficient of friction between the mold and a separator material (a substrate with a carbon layer formed on the surface thereof) increases during the subsequent press working, thereby inhibiting the motion of the separator material during the pressing and deteriorating the working accuracy for the separator material, so that, for example, a channel portion becomes cracked and largely warped, and thus, the sealability of a bonded portion (portion where the separator is bonded to fuel cells) is deteriorated.

The present disclosure has been made in view of the aforementioned problem, and provides a method for producing a fuel cell separator capable of ensuring the working accuracy for a separator material.

SUMMARY

According to an embodiment of the present disclosure, there is provided a method for producing a fuel cell separator, the method including preparing a separator material provided with a coating layer on the surface thereof, supplying the separator material and/or a mold with a machining oil and/or air, and pressing the separator material using the mold so as to be molded into a predetermined shape, wherein the surface of the mold is provided with grooves, each groove having a depth and a width that are each equivalent to or larger than the thickness of the coating layer and equivalent to or smaller than the thickness of the separator material.

Further, the depth of the groove is preferably set smaller than the width thereof.

Furthermore, it is preferable that the mold include an upper die and a lower die, the upper die having a projection/recess pressing surface on which recessed and projecting surfaces extending in a predetermined direction are alternately provided, and the lower die having a projection/recess pressing surface in a shape complementary to that of the pressing surface of the upper die, in which in the pressing, the separator material is pressed vertically using the upper die and the lower die, with surfaces of the separator material that are each provided with the aforementioned coating layer as upper and lower surfaces, so as to be molded into one of a wavelike shape or a projection/recess shape, and on the upper die, the grooves are provided in an extending manner in a direction orthogonal to the predetermined direction on the recessed surface and in the predetermined direction on the projecting surface and on the lower die, the grooves are provided in an extending manner in the predetermined direction on the recessed surface and in the direction orthogonal to the predetermined direction on the projecting surface.

According to the present disclosure, particles that have peeled off from the separator material in the pressing enter the grooves provided on the surface of the mold and are then also easily discharged through the grooves, so that the amount of particles remaining on the surface of the mold can be reduced. Therefore, when the pressing is repeated, the coefficient of friction between the mold and a separator material can be reduced and the motion of a separator material in the subsequent pressing is not inhibited, so that the separator material can be accurately worked.

DETAILED DESCRIPTION

The configuration of the present disclosure will be described below in detail based on an example of an embodiment shown in the drawings. As an example of the present disclosure, a fuel cell or a fuel cell system including it to be mounted on a fuel cell vehicle will be described, but the range of application of the present disclosure is not limited thereto.

[Configuration of Fuel Cell Stack Provided with Separators]

Figure 1:
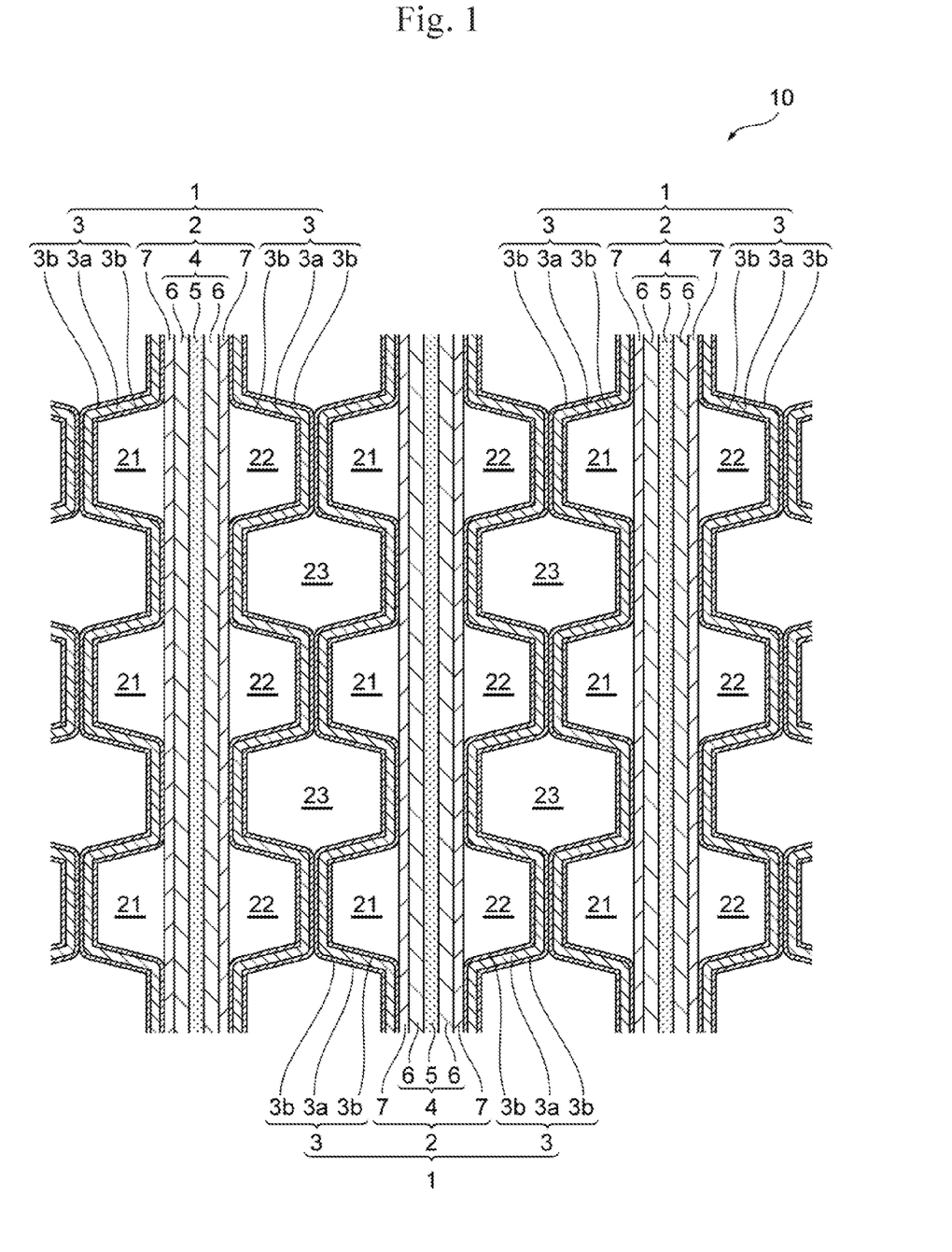
FIG. 1 is a cross-sectional view of the main part of a fuel cell stack that includes separators.

FIG. 1 is a cross-sectional view of the main part of a fuel cell stack 10. As shown in FIG. 1, the fuel cell stack 10 has a plurality of cells 1 stacked, each cell 1 being a basic unit. The cell 1 is a polymer electrolyte fuel cell that generates electromotive force through an electrochemical reaction between an oxidant gas (for example, air) and a fuel gas (for example, hydrogen). The cell 1 includes a MEGA 2 and a separator (fuel cell separator) 3 that contacts the MEGA 2 so as to isolate it from an adjacent MEGA 2. It should be noted that in the present embodiment, the MEGA 2 is sandwiched by a pair of separators 3.

The MEGA 2 includes a membrane electrode assembly (MEA) 4 and gas diffusion layers 7 disposed on the opposite sides of the MEA 4 that are integrally formed. The MEA 4 includes an electrolyte membrane 5 and a pair of electrodes 6 joined to the electrolyte membrane 5 so as to sandwich it. The electrolyte membrane 5 includes a proton-conductive ion-exchange membrane made of a polymer electrolyte material and each electrode 6 is made of, for example, a porous carbon material that carries a catalyst such as platinum. The electrodes 6 disposed on the opposite sides of the electrolyte membrane 5 function as anode and cathode, respectively. Each gas diffusion layer 7 is made of a gas-permeable conductive member, such as a carbon porous body, for example, carbon paper and carbon cloth, or a metal porous body, for example, a metal mesh and a foam metal.

In the present embodiment, the MEGA 2 functions as an electricity-generating portion of the fuel cell stack 10, and each separator 3 contacts each gas diffusion layer 7 of the MEGA 2. Further, if the gas diffusion layers 7 are not provided, the MEA 4 functions as the electricity-generating portion, in which case, the separators 3 contact the MEA 4. Therefore, the electricity-generating portion of the fuel cell stack 10 includes the MEA 4 and contacts the separators 3.

Each separator 3 is a plate member that includes a substrate made of a highly conductive and gas impermeable metal (for example, SUS, titanium, aluminum, and nickel). One side of the separator 3 contacts the gas diffusion layer 7 of the MEGA 2 and the other side contacts one side of an adjacent separator 3.

Further, in the present embodiment, the opposite sides (one side that contacts the gas diffusion layer 7 of the MEGA 2 and the other side that contacts one side of an adjacent separator 3) of each separator 3 (a substrate 3a thereof) each have formed thereon a coating layer 3b containing carbon particles as a conductive coating. It should be noted that an intermediate layer (not shown) may be provided between the substrate 3a of the separator 3 and the coating layer 3b.

The coating layer 3b is only required to have conductivity and corrosion resistance, and examples of materials for forming the coating layer 3b include carbon and also Au (gold), Pt (platinum), $In_2O_3$ (indium oxide), ZnO (zinc oxide), and $SnO_2$ (tin oxide), which have been confirmed to peel off upon contacting a mold during pressing, thereby causing the same problem as that caused when carbon is used. A method for forming the coating layer (in particular, a carbon layer) 3b on the surface of the separator 3 (the substrate 3a thereof) is not particularly limited, and examples of such a method include plasma CVD (chemical vapor deposition using plasma), spray coating of the surface of the substrate with carbon particles (a mixture of carbon particles with resin or a solvent may be used), transcription, vacuum deposition, sputtering, and physical vapor deposition (PVD) utilizing ion plating. Further, the coating layer (in particular, a carbon layer) 3b may have either an amorphous structure or a crystalline structure (graphite structure), and may contain nitrogen (N). When a nitrogen-containing gas is used as a bombarding gas or a coat-forming gas during the process of plasma CVD, the nitrogen is taken into the coating layer 3b. The thickness (coating thickness) of the coating layer 3b is not particularly limited, but may be set to, for example, around 0.01 μm to 0.2 μm. The thickness (plate thickness) of the substrate 3a of the separator 3 is not particularly limited, either, but may be set to, for example, about 10 μm or greater when the substrate 3a is a titanium substrate (that contains pure titanium or a titanium alloy).

In the present embodiment, each separator 3 (the cross section thereof) is formed in a wavelike shape or a projection/recess shape. The separator 3 is shaped such that its wavelike shape forms an isosceles trapezoid having a flat top portion with the opposite ends being equally angular. That is, the separator 3 is almost identically shaped when viewed from both the front and back sides thereof. One of the gas diffusion layers 7 of the MEGA 2 contacts the top portions of one separator 3 on their surfaces and the other of the gas diffusion layers 7 of the MEGA 2 contacts the top portions of the other separator 3 on their surfaces.

The separator 3 is molded (plastically deformed) so as to have the aforementioned shape through press-molding of a separator material 3c, which has the substrate 3a with the coating layers 3b formed on the surface thereof, using a mold. This will be described later in detail.

A gas channel 21 defined between the gas diffusion layer 7 on the side of one electrode (that is, anode) 6 and one separator 3 is a channel through which a fuel gas flows, and a gas channel 22 defined between the gas diffusion layer 7 on the side of the other electrode (that is, cathode) 6 and the other separator 3 is a channel through which an oxidant gas flows. When a fuel gas and an oxidant gas are respectively supplied to the gas channels 21 and 22 that face each other via the MEGA 2, an electrochemical reaction takes place within the cell 1, so that an electromotive force is generated.

In addition, one cell 1 and an adjacent cell 1 are disposed such that the electrode 6 as anode of one cell 1 and the electrode 6 as cathode of the adjacent cell 1 face each other. Further, the top portions on the back side of one separator 3 disposed along the electrode 6 as anode of one cell 1 and the top portions on the back side of another separator 3 disposed along the electrode 6 as cathode of the adjacent cell 1 contact with each other on their surfaces. Water as a refrigerant for cooling the cells 1 flows through a space 23 defined between the separators 3 that contact on their surfaces between the adjacent two cells 1.

[Production Process for Separator]

Figure 2:
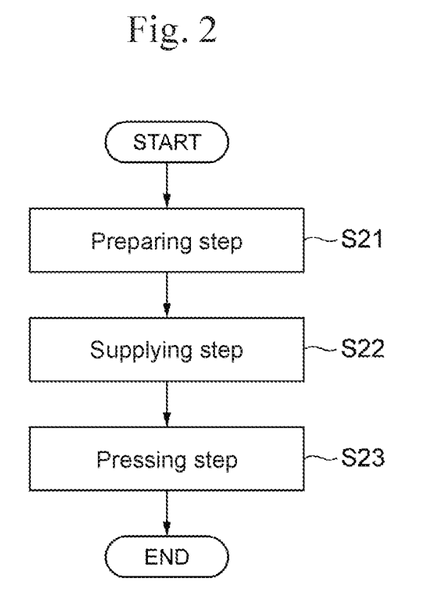
FIG. 2 is a flowchart showing an outline of a production process for the separator.
Figure 3:
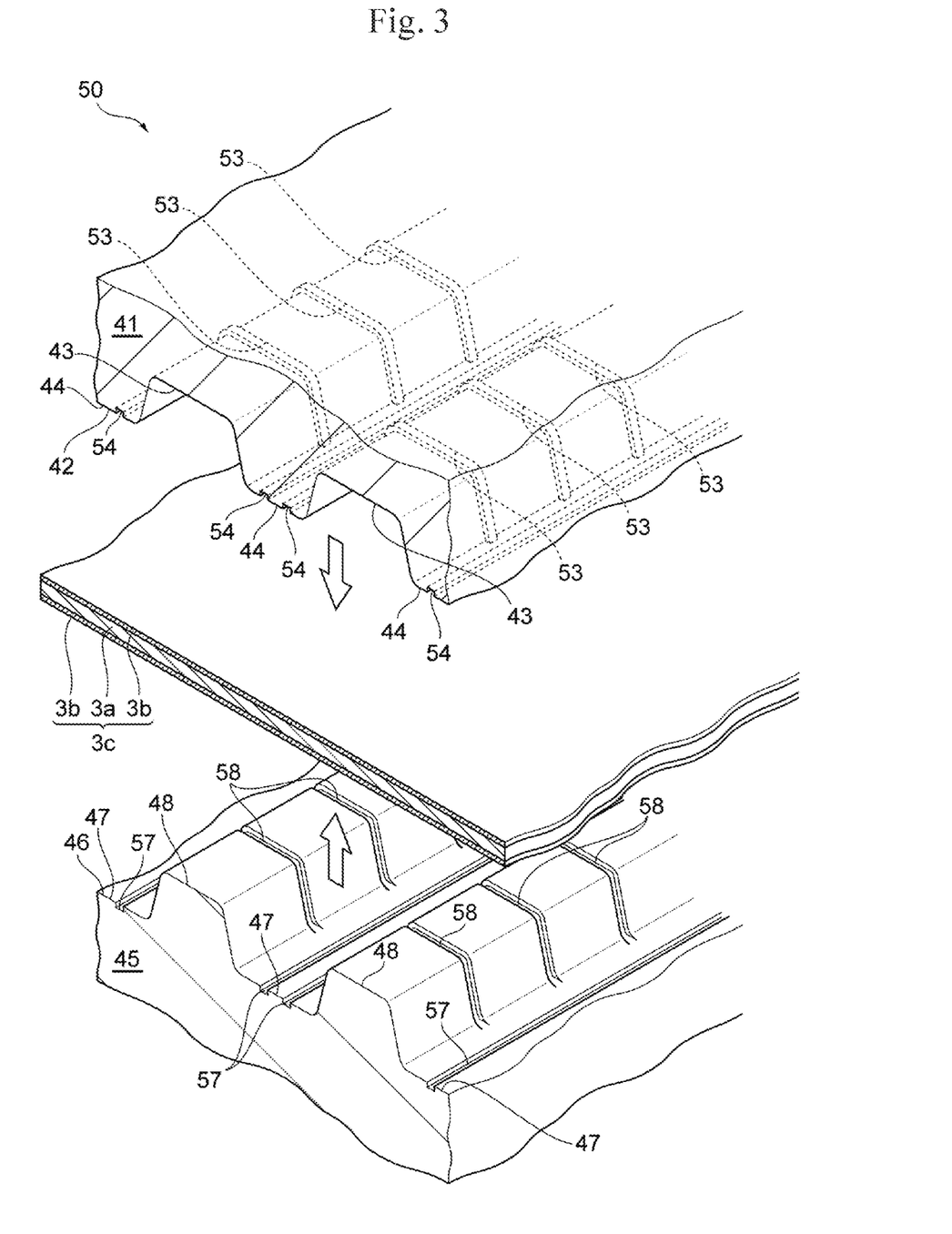
FIG. 3 is an enlarged perspective cross-sectional view of a mold used for production of the separator.
Figure 4:
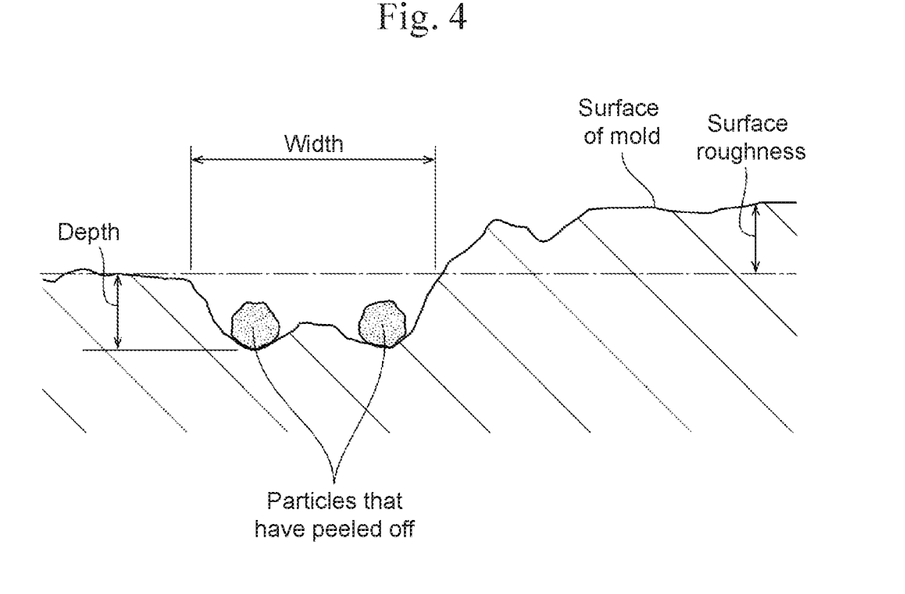
FIG. 4 is an enlarged cross-sectional view of the main part of the mold used for the production of the separator.
Figure 5:
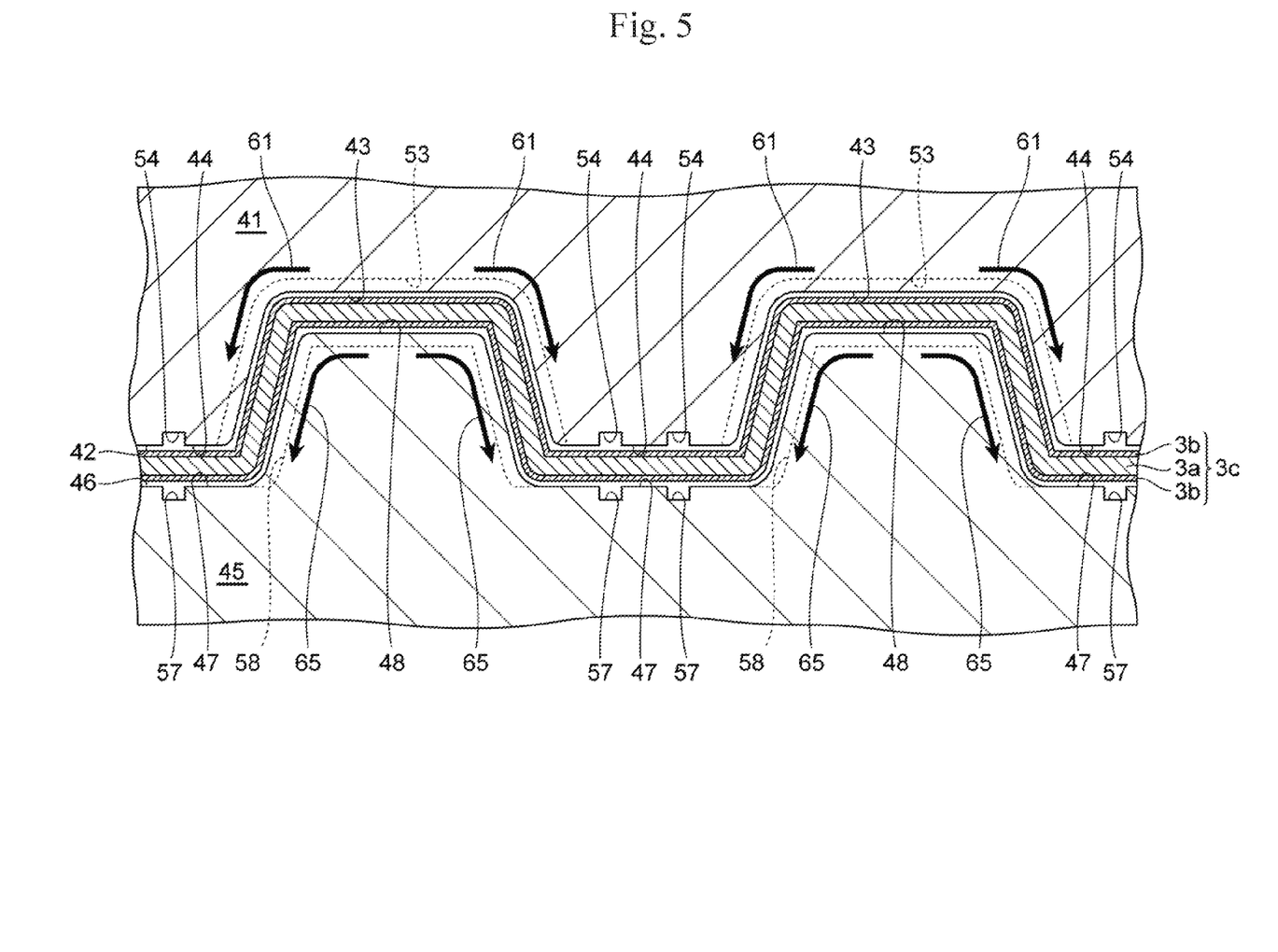
FIG. 5 is an enlarged cross-sectional view of the separator and mold in the process of its production.

FIG. 2 is a flowchart showing an outline of a production process for the separator. FIGS. 3 and 4 are an enlarged perspective cross-sectional view of a mold and an enlarged cross-sectional view of the main part of the mold used for production of the separator, respectively. FIG. 5 is an enlarged cross-sectional view of the separator and mold in the process of its production.

In the present embodiment, the aforementioned separator 3 is molded into a wavelike shape or a projection/recess shape using a mold 50 that includes an upper die 41 and a lower die 45, the upper die 41 having a projection/recess pressing surface 42 on which recessed surfaces (that dents upward) 43 and projecting surfaces (that bulges downward) 44 that extend in a predetermined direction (gas flow direction in the gas channels) are alternately provided, and the lower die 45 having a projection/recess pressing surface 46 in a shape complimentary to that of the projection/recess surface (the pressing surface 42) of the upper die, such that the separator material 3c (the material that has the substrate 3a with the coating layers 3b formed on the surface thereof) as the material for the separator 3 is pressed vertically by means of the upper die 41 (the pressing surface 42 thereof) and the lower die 45 (the pressing surface 46 thereof).

Further, in the present embodiment, the surfaces (the pressing surfaces) of the mold 50, specifically, the pressing surface 42 of the upper die 41 and the pressing surface 46 of the lower die 45 each have formed thereon a substantially recessed (as viewed in cross section) groove, so as to smoothly discharge particles (in other words, so as to promote the discharge of particles) of the coating layers 3b (carbon layers or the like containing a titanium oxide when the substrate 3a is a titanium substrate) that have peeled off from the separator material 3c during the pressing of the mold 50. The depth and width of the substantially recessed groove are each set to greater than the size of each particle of the coating layers 3b that would peel off from the separator material 3c.

More specifically, as can be clearly understood from FIG. 3, on the pressing surface 42 of the upper die 41, a substantially recessed groove 53 is provided on the recessed surface (that dents upward) 43 in an extending manner in a direction orthogonal to the predetermined direction (the gas flow direction in the gas channels), and a substantially recessed groove 54 is provided on the projecting surface (that bulges downward) 44 in an extending manner along the predetermined direction (the gas flow direction in the gas channels) (from one end to the other end of the projecting surface 44). Further, on the pressing surface 46 of the lower die 45, a substantially recessed groove 57 is provided on the recessed surface 47 (that dents downward) in an extending manner along the predetermined direction (the gas flow direction in the gas channels) (from one end to the other end of the recessed surface 47), and a substantially recessed groove 58 is provided on the projecting surface (that bulges upward) 48 in an extending manner in the direction orthogonal to the predetermined direction (the gas flow direction in the gas channels).

The numbers of the grooves 53 provided on the recessed surface 43 and the grooves 54 provided on the projecting surface 44 of the pressing surface 42 of the upper die 41 and the numbers of the grooves 57 provided on the recessed surface 47 and the grooves 58 provided on the projecting surface 48 of the pressing surface 46 of the lower die 45 are not particularly limited, and each of the numbers of the grooves may be one or more than one. When a plurality of grooves are provided, for example, the grooves are formed at predetermined intervals therebetween. Further, the groove 54 provided on the projecting surface 44 of the pressing surface 42 of the upper die 41 and the groove 57 provided on the recessed surface 47 of the pressing surface 46 of the lower die 45 are preferably provided around portions corresponding to corners of the separator 3, because during press working, the coating layers 3b tend to peel off at the corners that are the deformed portions of the separator 3.

Furthermore, a method for forming the grooves 53, 54, 57, and 58 on the surface of the mold 50 is not particularly limited, and examples of the method include machining (such as cutting and grinding) of the surface of the mold 50 (see, for example, JP 2005-199421 A), electrical discharge machining of the surface of the mold 50, and pressing a projection/recess-shaped object onto the surface of the mold 50 so as to transfer the projection/recess shape thereto. In addition, a very small projection/recess shape may be formed on the surface of the mold 50 using a 3D printer or the like, or making full use of printing techniques. When machining (such as cutting and grinding) of the surface of the mold 50 is performed so as to provide the grooves 53, 54, 57, and 58 thereon, determining the direction of machining the mold 50 enables each of the grooves 53, 54, 57, and 58 to be formed as a very small recessed pattern that is left unmachined.

The depth and width of each of the aforementioned substantially recessed grooves 53, 54, 57, and 58 are each only required to be set to greater than the size of each particle of the coating layers 3b (with a maximum coating thickness of around 0.2 μm) that would peel off, for example, 0.2 μm or greater, so that the particles of the coating layers 3b that have peeled off enter the grooves and are smoothly discharged. Further, the depth and width of each groove are each only required to be set equivalent to or smaller than the thickness (plate thickness) of the separator material 3c considering the effect on the moldability of the separator material 3c, for example, 10 μm or smaller. In addition, the depth (the dimension in the direction of machining the separator material 3c) of each of the grooves 53, 54, 57, and 58 is preferably set smaller than the width (the dimension in the direction orthogonal to the direction of machining the separator material 3c) thereof, and it has been confirmed to be preferable that the depth of each groove be set to, for example, around 20% of the width of each groove. That is, the width and depth of each of the aforementioned substantially recessed grooves 53, 54, 57, and 58 are not particularly limited, but are preferably set to, for example, 0.2 μm to 10 μm and 0.2 μm to 2 μm, respectively. Further, the surface roughness (Ra) of each groove is preferably set to, for example, 0.15 or smaller (see FIG. 4).

Next, the method for producing the separator 3 using the mold 50 with the aforementioned grooves 53, 54, 57, and 58 will be described.

As shown in FIG. 2, the separator material 3c as the material (in a state before molded) for the separator 3 is prepared such that, for example, plasma CVD (chemical vapor deposition using plasma) is first performed so as to form the coating layer 3b containing carbon particles on the surface of the substrate 3a that has been molded into a flat plate (a titanium oxide layer that has been formed on the outermost surface layer of the substrate 3a when the substrate 3a is a titanium substrate, for example) (S21: preparing step).

Then, the separator material 3c in a flat plate is placed between the upper die 41 and the lower die 45, with its surfaces each having the coating layer 3b formed thereon as upper and lower surfaces, and the surfaces of the separator material 3c and mold 50 (the pressing surface 42 of the upper die 41 and the pressing surface 46 of the lower die 45) are supplied with machining oil (S22: supplying step).

It should be noted that the separator material 3c may be supplied with the machining oil before its placement between the upper die 41 and the lower die 45. Further, the surface of the mold 50 may be supplied with the machining oil before the placement of the separator material 3c between the upper die 41 and the lower die 45, or immediately after the press working of the anterior separator material 3c.

Next, press working of the separator material 3c is performed such that the separator material 3c is vertically sandwiched by means of the upper die 41 (the pressing surface 42 thereof) and the lower die 45 (the pressing surface 46 thereof) with a predetermined pressure (S23: pressing step). Through these processes, the separator material 3c is molded into a wavelike shape or a projection/recess shape (as viewed in cross section in the predetermined direction), so that gas channels are formed on the separator material 3c.

Herein, as described above, in the present embodiment, the substantially recessed (as viewed in cross section) grooves 53, 54, 57, and 58 are formed on the pressing surface 42 of the upper die 41 and the pressing surface 46 of the lower die 45 of the mold 50. Therefore, in the pressing step S23, although a portion of the coating layers 3b on the surfaces (upper and lower surfaces) of the separator material 3c may possibly peel off, the particles of the coating layers 3b that have peeled off enter the substantially recessed grooves 53, 54, 57, and 58 (each of which is larger than each particle of the coating layers 3b that have peeled off) (see FIG. 4) and are discharged to the outside of the mold 50 together with the machining oil along the substantially recessed grooves 53, 54, 57, and 58 (see FIG. 5), during the pressing of the separator material 3c by means of the upper die 41 and the lower die 45.

More specifically, it has been confirmed that in the pressing step S23, the coating layers 3b are likely to peel off at corners (of the separator 3) that are the deformed portions of the separator material 3c, but on the pressing surface 42 of the upper die 41, the particles of the coating layers 3b that have peeled off at such corners pass through the groove 53 on the recessed surface 43 and flow onto the projecting surface 44, and then pass through the groove 54 on the projecting surface 44 so as to be discharged to the outside of the mold 50 together with machining oil (see arrows 61 of FIG. 5). Meanwhile, on the pressing surface 46 of the lower die 45, the particles pass through the groove 58 on the projecting surface 48 and flow onto the recessed surface 47, and then pass through the groove 57 on the recessed surface 47 so as to be discharged to the outside of the mold 50 together with the machining oil (see arrows 65 of FIG. 5).

Through repeating the aforementioned series of steps (preparing step, supplying step, and pressing step), the separators 3 of the fuel cell stack 10 are continuously produced.

It should be noted that in the aforementioned embodiment, the machining oil together with the particles of the coating layers 3b that have peeled off are discharged through the substantially recessed grooves 53, 54, 57, and 58. However, it is needless to describe in detail that even without such machining oil, a similar advantageous effect can be obtained if the particles of the coating layers 3b that have peeled off are blown using air provided inside the mold 50 so as to be discharged. Further, as long as each groove has a volume large enough to accommodate the particles of the coating layers 3b that would peel off, the machining oil may be applied to several products all at once, but not to each single product.

As described above, in the present embodiment, since the surface of the mold 50 is provided with the grooves 53, 54, 57, and 58, each of which is larger than each particle of the coating layers 3b that would peel off from the separator material 3c, that is, the grooves 53, 54, 57, and 58, each having a depth and a width that are each equivalent to or larger than the thickness of each coating layer 3b and equivalent to or smaller than the thickness of the separator material 3c, the particles that have peeled off from the separator material 3c in the pressing step enter the grooves 53, 54, 57, and 58 provided on the surface of the mold 50 and are then also easily discharged through the grooves, so that the amount of particles remaining on the surface of the mold 50 can be reduced. Therefore, when the pressing step is repeated, the coefficient of friction between the mold 50 and the separator material 3c can be reduced and the motion of the separator material 3c in the subsequent pressing step is not inhibited, so that the separator material 3c can be accurately worked.

Further, since on the upper die 41, the groove 53 is provided on the recessed surface 43 in an extending manner in the direction orthogonal to the predetermined direction (the gas flow direction in the gas channels) and the groove 54 is provided on the projecting surface 44 in an extending manner in the predetermined direction, and on the lower die 45, the groove 57 is provided on the recessed surface 47 in an extending manner in the predetermined direction and the groove 58 is provided on the projecting surface 48 in an extending manner in the direction orthogonal to the predetermined direction, the particles that have peeled off from the separator material 3c in the pressing step can be smoothly discharged along the grooves 53, 54, 57, and 58. Further, since the grooves 53 and 58 are provided in the direction orthogonal to the predetermined direction (the gas flow direction in the gas channels) on the recessed surface 43 of the upper die 41 and the projecting surface 48 of the lower die 45, respectively, there is also an advantageous effect that the motion (molding) of the separator material 3c in the press working would not be inhibited by the grooves 53 and 58.

Although the embodiment of the present disclosure has been described in detail with reference to the drawings, the specific configuration is not limited thereto, and any design changes that may occur within the spirit and scope of the present disclosure are all included in the present disclosure.

DESCRIPTION OF SYMBOLS

1 Cell
2 MEGA
3 Separator
3a Substrate of separator
3b Coating layer
3c Separator material
4 Membrane electrode assembly (MEA)
5 Electrolyte membrane
6 Electrode
7 Gas diffusion layer
10 Fuel cell stack (fuel cells)
21 and 22 Gas channels
23 Space through which water flows
41 Upper die
42 Pressing surface of upper die
43 Recessed surface of pressing surface of upper die
44 Projecting surface of pressing surface of upper die
45 Lower die
46 Pressing surface of lower die
47 Recessed surface of pressing surface of lower die
48 Projecting surface of pressing surface of lower die
50 Mold
53, 54, 57, and 58 Grooves

What is claimed is:

1. A method for producing a fuel cell separator, the method comprising:
    preparing a separator material with a coating layer provided on a surface thereof;
    supplying, to at least one of the separator material or a mold, at least one of a machining oil or air; and
    pressing the separator material using the mold so as to be molded into a predetermined shape,
    wherein the surface of the mold is provided with a groove having a depth and a width, each being equivalent to or larger than a thickness of the coating layer and equivalent to or smaller than a thickness of the separator material.

2. The method for producing a fuel cell separator according to claim 1, wherein the depth of the groove is smaller than the width thereof.

3. The method for producing a fuel cell separator according to claim 1,
    wherein:
    the surface of the separator material is a first surface,
    the mold includes an upper die and a lower die, the upper die having a projection/recess pressing surface on which a recessed surface and a projecting surface are alternately provided, the recessed surface and the projecting surface extending in a predetermined direction, and the lower die having a projection/recess pressing surface in a shape complementary to a shape of the pressing surface of the upper die,
    in the preparing, each of the first surface of the separator material and a second surface of the separator material is provided with the coating material,
    in the pressing, the separator material is pressed vertically using the upper die and the lower die, with the first and second surfaces of the separator material that are each provided with the coating layer as upper and lower surfaces, so as to be molded into one of a wavelike shape or a projection/recess shape,
    on the upper die, the groove is provided on the recessed surface in an extending manner in a direction orthogonal to the predetermined direction, and the groove is provided on the projecting surface in an extending manner in the predetermined direction, and
    on the lower die, the groove is provided on the recessed surface in an extending manner in the predetermined direction, and the groove is provided on the projecting surface in the direction orthogonal to the predetermined direction.

* * * * *